Patented Aug. 21, 1951

2,565,194

UNITED STATES PATENT OFFICE 2,565,194

CHLOROTRIAZINE RESINS AND PROCESS OF MAKING THE SAME

Jack C. Bacon, Stamford, and William F. Hart, Glenbrook, Conn., assignors to American Cyanamid Company, New York, N. Y., a corporation of Maine No Drawing. Application March 27, 1947, Serial No. 737,732

9 Claims. (Cl. 260—67.6)

This invention relates to N-substituted triaminotriazines and resins prepared therefrom. It is also included in the scope of the invention to provide a process for preparing N-substituted triazine resins having improved characteristics and film-forming properties.

Generally, the invention may be stated as combining air-drying and thermosetting properties in a single resin which will be internally plasticized, and will be resistant to soaps and alkalis. The preparation of specific substituted triaminotriazines, and the conversion of these materials to resins for surface coatings, are obtained by reacting a drying oil amine in molar quantities with chlorotriazines, and further reacting the resulting N-substituted aminotriazine with formaldehyde to impart thermosetting properties thereto. The resins thus formed have both air-drying and thermosetting properties without the brittleness of straight unmodified thermosetting amino resins, and without the softness of unmodified alkyd resins. Also the alkali sensitive ester linkage of the alkyd resins has been eliminated.

In order to more fully describe the invention, the following specific examples are given, it being fully understood, however, that the invention is not limited to the particular conditions or particular reactants given herein.

Example 1

To 24 parts (0.165 mol) of 2-chloro-4,6-diamino-1,3,5-triazine suspended in 750 parts of water, there is added 44 parts (0.163 mol) of soya amines. The suspension is heated to reflux and then 7 parts (0.175 mol) of sodium hydroxide in 15 parts of water is added at such a rate the reaction mixture is maintained slightly on the alkaline side. Refluxing is continued during the addition of sodium hydroxide, and for about 3 hours after the addition of the sodium hydroxide is completed. The resulting product is a soya substituted triaminotriazine of the following general formula:

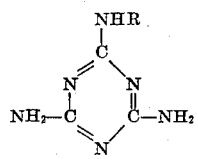

where R represents the usual mixture of octadecadiene, octadecene and octadecane radicals present in soya amines. This product is recrystallized from aqueous alcohol to give a pale waxy solid. A solution of this material in an organic solvent such as xylene exhibits drying and film-forming properties in the presence of a drier. To 19 parts (0.05 mol) of this product there is added 16.2 parts of a 37% aqueous formaldehyde solution (0.20 mol) and 40 parts of butanol. The mixture is refluxed under a continuous cycling and decantation apparatus until the water is completely removed. The resulting resin solution has a solids content of 52% and exhibits excellent film-forming characteristics; and, it is cured either by air drying or by baking at 300° F. for 15 minutes to form clear, tough films which have excellent alkali resistance. Before curing, the resin may be diluted with additional petroleum solvents if desired.

The above experiment is repeated with the exception that butanol is not present during the reaction with formaldehyde. Since the soya fatty chains impart sufficient solubility to the product to eliminate the necessity of alkylation, the formaldehyde may be reacted with the N-substituted triazine to give a reaction product which forms films with good characteristics.

Example 2

| | |
|---|---:|
| Water | gms__ 125 |
| 2-choloro-4,6-diamino-triazine | gms__ 18 |
| Soya amine | gms__ 34 |
| Sodium hydroxide 5N | ml__ 40 |

The water, triazine, and soya amine is mixed and heated to reflux, and held at that temperature while the sodium hydroxide is slowly added, approximately one hour and fifteen minutes being required for this addition. The heat is then turned off and a heavy white solid of paste consistency results. This paste is poured in a flat tray and dried in a forced draught oven at 100° C. until the larger portion of the water is removed. The product is completely dried over phosphorous pentoxide in a vacuum desiccator to a constant weight. Thirty-seven and five tenths (37.5) gms. of this dry intermediate is dispersed in 50 gms. of butanol which is acidified with 0.7 ml. of phosphoric acid. This dispersion is heated to 50° C. and 36 gms. of a 37% formaldehyde solution added. The mixture is then heated to reflux and held at that temperature for approximately an hour and forty-five minutes, and then the heating is discontinued. The solution is filtered and the filtrate dehydrated by decantation distillation.

Other suitable resins are prepared according to the procedure outlined above by reacting an aldehyde, and preferably formaldehyde, with the reaction product of molecular equivalents of a drying oil amine with other monochlorotriazines such as chloro-di-(ethylamino)-triazine. chloro-di-(butylamino)-triazine, chloro-di-(octylamino)-triazine, chloro-di-(tetradecylamino)-triazine, chloro-amino-tetradecylamino-triazine, chloro-amino-ethylamino-triazine, chloro-amino-butyl-amino-triazine. The alkyl amine substituted triazines enhance the solubility of the resultant resins, and the solubility seems to increase with the length of the carbon chain of the alkyl radical as well as the number of alkyl substitutions. Other resins are prepared by reacting an aldehyde with the reaction product of drying oil amines with polychlorotriazines. The number of molecular equivalents of drying oil amine employed should be at least equal to the number of chlorine groups, and, preferably, should be slightly in excess thereof. As examples of such polychlorotriazines there may be mentioned trichlorotriazine, dichloro-tetradecylamino-triazine, dichloro-octyl-amino-triazine, dichloro-butyl-amino-triazine, dichloro-ethylamino-triazine, and dichloro-amino-triazine. When the polychlorotriazines are employed according to the teachings of this invention, the properties of the thermosetting triazine-aldehyde resin decrease, whereas the alkyd properties of the resin increase due to the increased quantity of drying oil amine employed in the formulation. For the optimum property of a resin having the combined properties of thermosetting resins and air drying resins, it is preferred to use the monochlorotriazines such as the chloro-diamino-triazines, the chloro-amino-alkylamino-triazines, and chloro-di-(alkylamino)-triazines in practicing this invention.

Any of the drying oil amines may be satisfactorily employed according to the teachings of this invention as a suitable reactant for the chlorotriazines. Among these amines there may be mentioned the amines of tung oil, linseed oil, cotton seed oil, cod liver oil, and croton oil.

The reaction between the drying oil amine and the chlorotriazine may be effected in an organic solvent such as methyl Cellosolve, ethyl Cellosolve, dioxane, butanol, ethanol, etc. The salt formed during the reaction may be removed by filtration and the intermediate product obtained in dry form by evaporation. The intermediate product may be left in organic solution, and further reacted with an aldehyde to provide a thermosetting or air drying resinous syrup having film forming properties.

The invention is not limited to formaldehyde in the preparation of the thermosetting resin. Other aldehyde and aldehyde-liberating substances may be employed; such as: para-formaldehyde, acetaldehyde, butylaldehyde, furfural and hexamethylenetetramine. The aldehyde, or aldehyde-liberating substance employed may be present in an amount sufficient to provide from about 1 to about 6 molecular equivalents of aldehyde per molecular equivalent of triazine. From a practical view point, it is preferred to employ from about 1.5 to about 4 molecular equivalents of aldehyde per molecular equivalent of triazine, as proportions outside of this range do not yield products suitable for processing according to the preferred applications of the final resinous products.

The resins of this invention are of particular value in the preparation of paint, lacquer, and varnish vehicles either of the air drying or thermosetting types. In addition thereto, the resins are also of particular value in imparting water repellency properties to pervious materials such as paper, cloth, and the like. The resin may be applied to such pervious materials by brush, dip, or spray coating or impregnating. A piece of cotton fabric was dipped in the resin solution of Example 1, passed through a squeeze roll, and heated for 15 minutes at 300° F.; the resulting article was water repellent.

We claim:

1. A composition comprising the heat reaction product of an aldehyde with the reaction product of a chlorodiaminotriazine and amine of soya oil, said amine of soya oil and chlorodiaminotriazine being present in molecular equivalent proportions, and said aldehyde being present in an amount from about 1 to about 6 molecular equivalents per molecular equivalent of triazine.

2. A composition comprising the heat reaction product of one molecular equivalent of 2-chloro-4,6-diamino-1,3,5-triazine and one molecular equivalent of amine of soya oil, condensed with from about 1.5 to about 4 molecular equivalents of formaldehyde.

3. A process comprising condensing an aldehyde with the reaction product of a chlorotriazine and an amine of a drying oil, wherein said chlorotriazine contains only chloro, amino and alkyl-amino substituents, wherein the reaction product of said triazine and said oil amine contains one molecular equivalent of amine of the oil amine for each chlorine group of the triazine and wherein said aldehyde is present in an amount varying between about 1 and about 6 molecular equivalents per molecular equivalent of triazine.

4. A process comprising condensing an aldehyde with the reaction product of a chlorodiaminotriazine and an amine of a drying oil, wherein the reaction product of said triazine and said oil amine contains equimolecular equivalents of said triazine and said oil amine and wherein said aldehyde is present in an amount varying between about 1 and about 6 molecular equivalents per molecular equivalent of triazine.

5. A process comprising condensing an aldehyde with the reaction product of a chloroamino-alkylaminotriazine and an amine of a drying oil, wherein the reaction product of said triazine and said oil amine contains one molecular equivalent of amine of the oil amine for each chlorine group of the triazine and wherein said aldehyde is present in an amount varying between about 1 and about 6 molecular equivalents per molecular equivalent of triazine.

6. A process comprising condensing an aldehyde with the reaction product of a chlorotriazine and an amine of a drying oil, wherein said chlorotriazine contains only chloro, amino and alkyl-amino substituents, wherein the reaction product of said triazine and said oil amine contains one molecular equivalent of amine of the oil amine for each chlorine group of the triazine and wherein said aldehyde is present in an amount varying between about 1.5 and about 4 molecular equivalents per molecular equivalent of triazine.

7. A process comprising condensing formaldehyde with the reaction product of a chlorotriazine and an amine of a drying oil, wherein said chlorotriazine contains only chloro, amino and alkyl-amino substituents, wherein the reaction product of said triazine and said oil amine contains one molecular equivalent of amine of the oil amine for each chlorine group of the triazine and wherein said formaldehyde is present in an amount varying between about 1.5 and about 4 molecular equivalents per molecular equivalent of triazine.

8. A process comprising condensing formaldehyde with the reaction product of 2-chloro-4,6-diamino-1,3,5-triazine and an amine of soya oil, wherein the reaction product of said triazine and said oil amine contains one molecular equivalent of amine of the oil amine for each chlorine group of the triazine and wherein said formaldehyde is present in an amount varying between about 1.5 and about 4 molecular equivalents per molecular equivalent of triazine.

9. A composition comprising the heat reaction product of an aldehyde with the reaction product of a chlorodiaminotriazine and an amine of a drying oil, said amine of a drying oil and said chlorodiaminotriazine being present in molecular equivalent proportions and said aldehyde being present in an amount varying between about 1 to about 6 molecular equivalents per molecular equivalent of triazine.

JACK C. BACON.
WILLIAM F. HART.

REFERENCES CITED

The following references are of record in the file of this patent:

UNITED STATES PATENTS

| Number | Name | Date |
| --- | --- | --- |
| 2,165,265 | Hubert | July 11, 1939 |
| 2,288,971 | Martin | July 7, 1942 |
| 2,328,957 | D'Alelio | Sept. 7, 1943 |
| 2,331,446 | Widmer | Oct. 12, 1943 |
| 2,361,823 | D'Alelio | Oct. 31, 1944 |
| 2,379,691 | D'Alelio | July 3, 1945 |
| 2,385,765 | Thurston | Sept. 25, 1945 |